United States Patent [19]

Abbey

[11] 4,254,004

[45] Mar. 3, 1981

[54] EMULSION PROCESS FOR POLYMER PARTICLES

[75] Inventor: Kirk J. Abbey, Cleveland, Ohio

[73] Assignee: SCM Corporation, New York, N.Y.

[21] Appl. No.: 37,389

[22] Filed: May 9, 1979

[51] Int. Cl.$^3$ .............................................. C08F 2/18
[52] U.S. Cl. .................................. 260/29.6 R; 526/80; 526/87
[58] Field of Search .................. 260/29.6 R, 29.6 RB; 526/66, 79, 80, 87

[56] References Cited

U.S. PATENT DOCUMENTS

| | | | |
|---|---|---|---|
| 3,485,808 | 12/1969 | Wiesner | 526/80 |
| 3,547,857 | 12/1970 | Murray | 526/66 |
| 3,890,261 | 6/1975 | Fitzgerald | 526/80 |
| 3,954,698 | 5/1976 | Bradley | 526/80 |
| 3,962,197 | 6/1976 | Khanna | 526/80 |
| 4,046,730 | 9/1977 | Tortai | 260/29.6 R |

*Primary Examiner*—Paul R. Michl
*Attorney, Agent, or Firm*—Thomas M. Schmitz

[57] ABSTRACT

An improved two-step process for producing bimodal emulsion polymer particles includes the steps of first providing uniform size polymer particles in the first stage by feeding monomers to the reaction mixture at a rate faster than the rate the monomers polymerize, and followed by a controlled second stage monomer polymerization by feeding monomers to the reaction mixture at a rate slower than the rate of polymerization of the monomers. The polymer particles are bimodal and are particularly useful in coatings, adhesives, and plastics.

4 Claims, 2 Drawing Figures

EMULSION PROCESS FOR POLYMER PARTICLES

BACKGROUND OF THE INVENTION

The present invention pertains to a process for synthesizing in situ bimodal uniform emulsion polymer particles wherein the average diameter of the larger modal particles are approximately 1.1 to 6 times the diameter of the smaller particles. Each modal of polymer particles is substantially uniform in size. Thus, for example a latex can be produced comprising a distribution of uniform particles of about 2000 Å intermixed with uniform particles of about 3000 Å. The resultant bimodal polymer particles can be homogeneous or heterogeneous and are particularly useful for providing improved physical properties in coatings, plastics, and adhesives.

Although emulsion polymerization processes have been suggested in the past, such processes ordinarily require particle surface coverage of the surfactants must be less than 100% surface coverage or less than critical-micelle-concentration (CMC). However, too little surfactant or considerably less than 100% surface coverage of the polymer particles introduces stability problems and produces considerable excessive coagulation. In commonly assigned Ser. No. 837,390 filed Sept. 28, 1977, the second stage monomer addition can be carefully controlled wherein the second stage monomer adds partly to seed particles and partly generates new particles. The disclosed process for controlling the level of second generation new particles provides a stabilized interdispersion of heterogeneous composite particles by controlling the levels of total surfactant above 105% seed surface coverage as well as controlling the balance ratio of non-ionic surfactant to anionic surfactants.

It now has been found that bimodal latex particles can be produced by controlling the rate of monomer feed relative to the rate of monomer polymerization. In particular, the first stage polymerization comprises a monomer feed rate faster than the rate of polymerization whereby excess monomer always exists in the reaction mixture. The second stage polymerization process comprises a monomer feed rate less than the monomer polymerization rate whereby monomer reacts and copolymerizes without having excess unreacted monomer in the reaction mixture. The polymer particles thus produced are uniformly bimodal polymer particles wherein each modal is approximately monodispersed. The diameter of the larger modal of particles can be between 1.1 to 6 times the diameter of the smaller polymer particles. These and other advantages of the process will become more apparent by referring to the Drawings and Detailed Description.

IN THE DRAWINGS

SUMMARY OF THE INVENTION

Briefly, the process of this invention pertains to a two-step latex polymerization of ethylenically unsaturated monomer wherein the monomer feed rate exceeds the monomer polymerization rate in the first step until the Trommsdorff exotherm occurs, followed in the second step wherein the monomer feed rate is slower than the monomer polymerization rate to produce in-situ bimodal latex polymer particles.

DETAILED DESCRIPTION OF THE INVENTION

The two-stage process of this invention pertains to a method of controlling the polymerization of ethylenically unsaturated monomers to produce in situ bimodal polymer particles wherein each modal particle distribution is substantially uniform in diameter. The latex produced comprises an in situ mixture of monodisperse polymer particles of two size distributions wherein the diameter of the larger particles are 1.1 to 6 times larger than the diameter of the smaller distribution particles, and preferably 1.5 to 3 times larger than the smaller particles.

Referring to the first stage processing, ethylenically unsaturated monomers are introduced into the reaction mixture at a rate faster than the rate of polymerization of the monomers. The reaction mixture contains polymerized monomer as well as unreacted monomer at any given time. The monomers reacted in the first stage polymerization processing can comprise by weight between about 10% to 40% of the total monomer feed in the entire process. The first stage is continued until the Trommsdorff gel effect or exotherm prior to commencing the second stage processing.

The second stage polymerization of monomers is effected at a polymerization rate faster than the feed rate of monomers. Stated otherwise, the second stage monomers are introduced into the reaction mixture at a rate slower or equal to the rate of polymerization. Thus, at any given time during second stage polymerization in accordance with this invention, the reaction mixture contains polymerized polymer particles and minor amounts of unreacted monomer. The minor amounts of unreacted monomer present at any given time in the second stage reaction mixture represents an instantaneous time-temperature delay wherein the unreacted monomer droplets at room temperature are heated to higher reaction temperatures as well as mixing and diffusing into the reaction mixture. The two-stage processing steps are further illustrated in the examples in conjunction with drawings.

Figure 1:
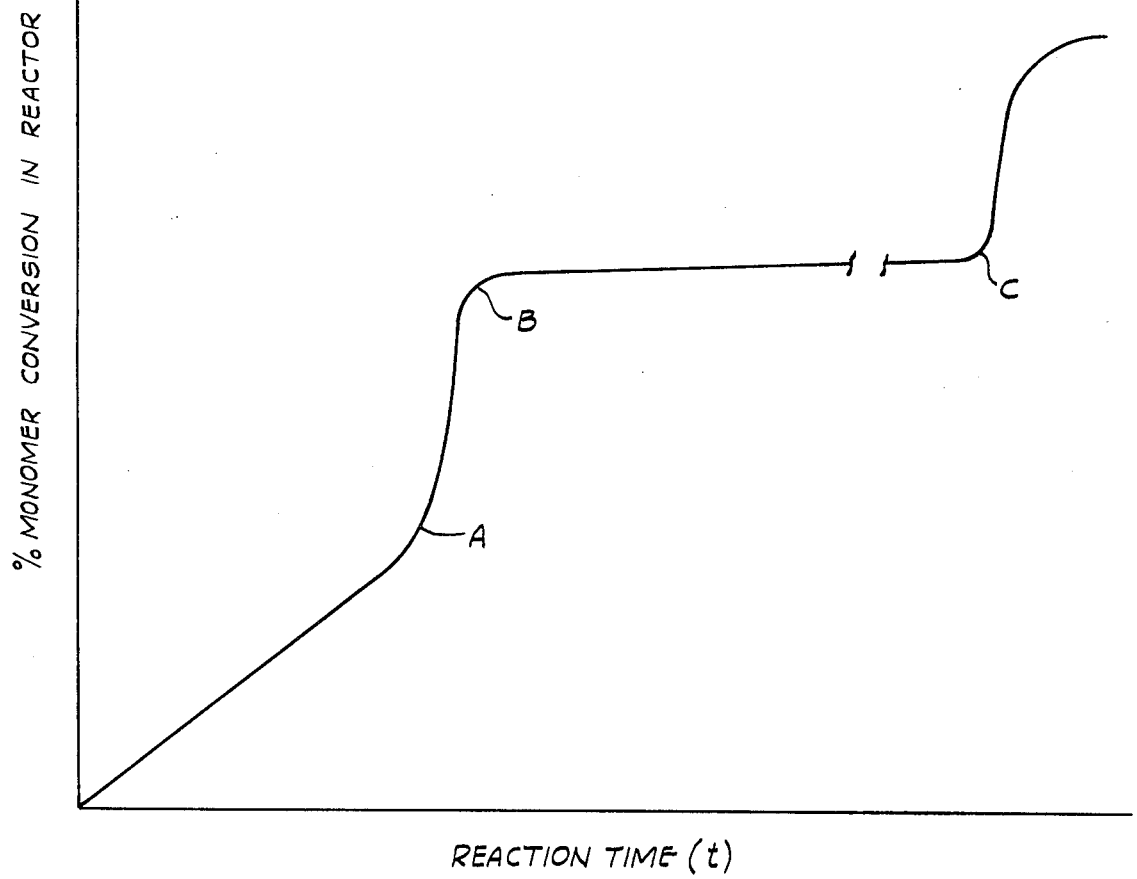
FIG. 1 illustrates a prior art process and relates the fraction (%) of monomer conversion (polymerization) vs. reaction time.

Referring now to the Drawings, FIG. 1 shows the fraction or % conversion of total monomers present in the reactor vs. reaction time in a typical prior art process. Ethylenic monomers are added to the reaction mixture and copolymerized until the onset of the Trommsdorff gel exotherm effect indicated in and at point A in FIG. 1. In prior art processes, the second stage monomers were ordinarily added prior to or after the exotherm so as to maintain control of the reaction during the Trommsdorff exotherm. Before or after the exotherm the second stage monomers can be added and continued until point C whereupon the reaction is continued until conclusion. In commonly assigned Ser. No. 837,390, filed Sept. 28, 1977, the second stage monomers advantageously were added to a dilute polymeric solution approximately coinciding with the peak exotherm indicated as point B to produce a stabilized and coagulum free latex.

Figure 2:
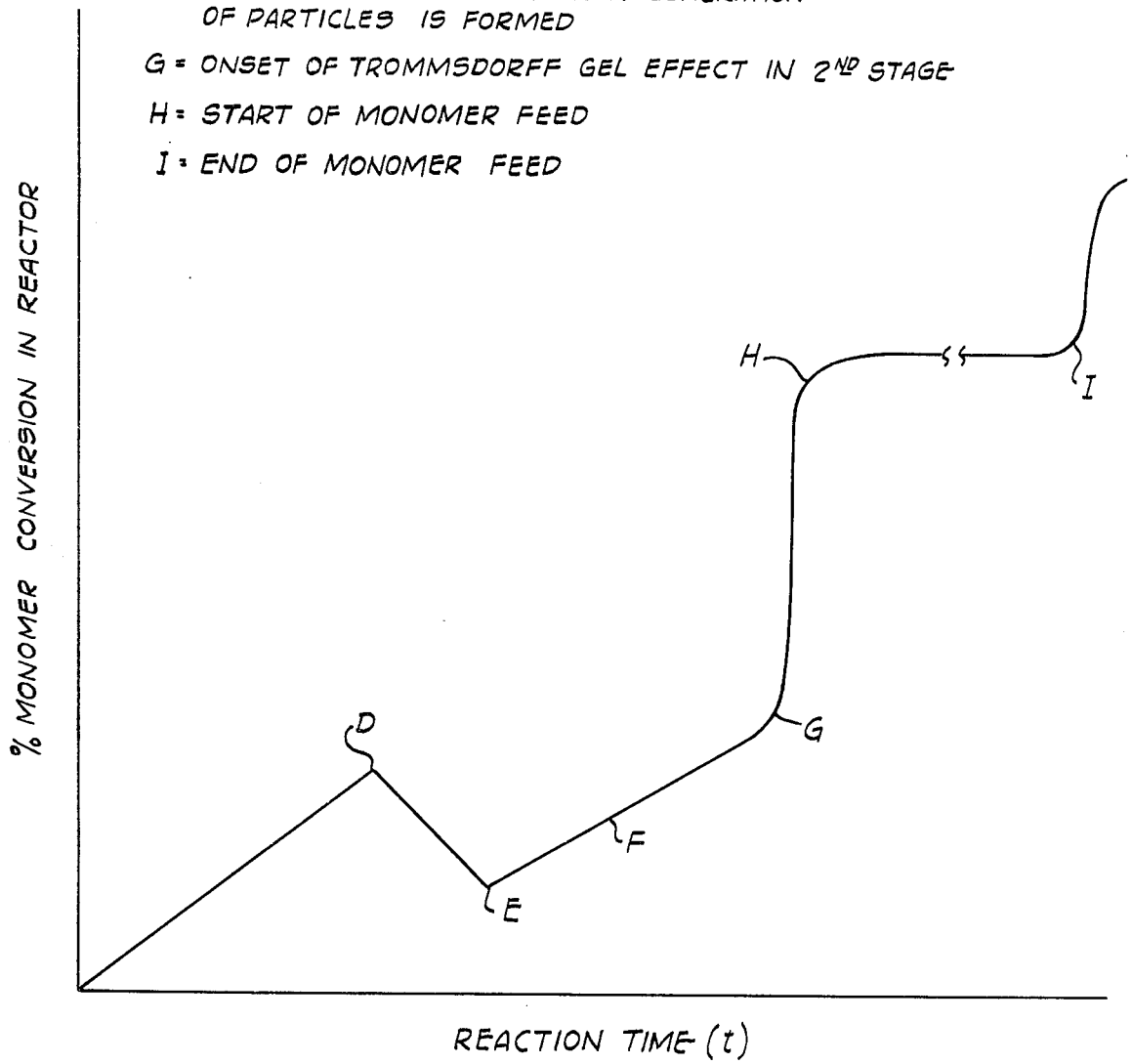
FIG. 2 illustrates the process of this invention and relates the fraction (%) of monomer conversion (polymerization) vs. reaction time.

Referring now to FIG. 2 illustrating the process in accordance with this invention, the (%) conversion of total ethylenic monomers present in the reaction mixture is plotted as a function of reaction time. Initially, monomers are added and polymerized to a point D and prior to the Trommsdorff gel effect exotherm. At point D and prior to the exotherm, first stage monomers are then added a feed rate faster than the polymerization rate of said monomer whereby the reaction mixture, contain excess unreacted monomer. The first stage monomers are continuously added at the faster rate until a point E is reached. At point E, the first stage monomer feed is concluded and the reaction mixture is held for continued polymerization of unreacted monomers and indicated in FIG. 2 as between points E and F. Between points E and F and after concluding the addition of first stage monomers, new generation particles are formed thereby giving rise to an in-situ bimodal polymer particles in the latex and continue to be formed until point G is reached wherein the Trommsdorff gel effect exotherm commences. Sometime after the start of the exotherm, such as point H, the second stage monomers are added to the reaction mixture at monomer feed rate less than the polymerization rate of said monomers. Hence, the second stage monomers react quite rapidly and limited only by a minor time-temperature delay in the reaction mixture. The second stage monomers are continued to be added to the reaction mixture at such lower rate until a point I is reached whereupon the addition ceases and the process is brought to conclusion thereafter. Thus, the process of this invention illustrated in FIG. 2 advantageously provides stabilized and coagulum free in situ bimodal latex wherein the larger polymer particle mode diameter can be between 1.1 and 6 times as large as the smaller polymer particle mode diameter.

The polymer particles thus produced in accordance with the two-step process of this invention are bimodal wherein each modal distribution is substantially monodispersed thereby providing a stabilized mixture of two uniform modals of polymer particles. The larger monodispersed particles can be approximately 1.1 to 6 times larger in diameter than the average diameter of the smaller monodisperse polymer particles. The monomers in both stages can be polymerized by an emulsion process of polymerizing monomers having carbon-to-carbon unsaturation such as ethylenically unsaturated monomers having negligble water solubility less than about 1% wherein emulsion polymerization can be advantageously carried out at temperatures between about 45° C. to about 100° C. Suitable polymers include for example homopolymers or copolymers or organic liquids having ethylenic unsaturation and generally include for example vinyl aromatic and aliphatic hydrocarbons such as styrene, alpha-methyl styrene, and similar substituted styrenes, vinyl naphthalene, vinyl toluene, divinyl benzene, and vinyl aliphatic hydrocarbons such as 1,3 butadiene, methyl-2-butadiene, 2,3-dimethyl butadiene, cyclopentadiene and dicyclopentadiene as well as ethylenically unsaturated esters and acids such as acrylic, methacrylic, ethacrylic, cinnamic and crotonic and the like and esters containing fumaric and maleic type unsaturation. Particularly preferred monomers include for example styrene, alpha-methyl styrene, tertiary butyl styrene, divinyl benzene 1,3 butadiene, isoprene, alkyl acrylates such as ethyl acrylate, butyl acrylate, methyl methacrylate, acrylonitrile, vinyl acetate, vinyl acrylate, and vinyl methacrylate, as well as similar ethylenically unsaturated monomers.

The kinetic or rate of monomer reaction during the emulsion polymerization can be monitored by a precision densitometer which continuously monitors the density of an emulsion polymerization. In determining the uniformity of particle diameter or monidispersity, the average weight diameter ($D_w$) is divided by the average number diameter ($D_n$) wherein the $D_w/D_n$ theoretically approaches 1.0 and preferably is within the range of 1.0 to 1.04 in accordance with this invention. The values $D_w$ and $D_n$ can be determined in accordance with the procedures described by Loranger et al, in the "Official Digest", Vol. 31, pages 482–520, particularly pages 491-2 (1959). Preferably, the seed weight average particle diameter $D_w$ is between about 500 Å and about 8000 Å as well as the monodispersity $D_w/D_n$ ratio being broadly between 1.0 and 1.1 and preferably between about 1.0 and 1.04.

A preferred aspect of this invention provides for a prepolymerization step comprising the pre-reaction of a batch feed of a minor amount of ethylenic monomers to provide initial seed particles. Thus, at least about 2% by weight of the monomers, and typically 10% and 20% by weight total monomers are pre-reacted. The balance of the monomers are then reacted in accordance with the second process step of this invention.

In accordance with this invention, polymerization to form a stable emulsion can be achieved by providing a certain combination of non-ionic and anionic surfactants in the monomer addition along with a polymerization initiator to form a latex particle from polymers and copolymers of ethylenically unsaturated vinyl monomers. Initiators can include for example inorganic peroxides such as sodium, potassium or ammonium persulfate, or organic peroxides such as hydrogen peroxide, benzoyl peroxide, acetyl peroxide, lauryl peroxide, acetone peroxide or acetone benzoyl peroxide, and methyl ethyl ketone peroxide and are usually added in amounts between about 0.1 to 2 weight percent based on the monomer addition. Suitable anionic surfactants include for example alkali and alkaline metal salts of fatty acids such salts of stearic, palmitic, oleic, lauric, myristic, as well as sulfonated oils, fatty alcohols and other sulfonated derivatives. The preferred anionic surfactants include sodium dodecyl benzene sulfonate, diesters of 2 sulfosuccinic acid salts such as hexyl, octyl, and higher alkyl diesters acid salts, etc. Suitable non-ionic surfactants include polyoxyethylene glycols reacted to a lyophilic compound to produce a hydrophile-lyophile balance (HLB) of between about 2 and 15 as set forth in U.S. Pat. No. 3,423,351. Suitable non-ionic surfactants include, for example, ethylene oxide condensation products reacted with t-octyl phenol or nonylphenol and known as "Triton" surfactants, polymerized oxyethylene (IgepalCA), ethylene oxide reacted with organic acid (Emulfor), or organic acid reacted with polyoxyamylene ether of stearic or oleic acid esters (Tweens).

In accordance with this invention, the monomers can be polymerized to polymer particles in an aqueous medium containing certain surfactants and reacted in a temperature range of about 50°–80° C. for about 4–16 hours. The water can be fixed at between about 30%–70% level and preferably at the 50% level based on total monomer reacted whereby the resulting composite latex would be approximately a 50% by weight latex.

Utilizing a fixed recipe and reaction temperature, the modality of a polymodal latex was discovered to be influenced by manipulating the monomer feed rate and the timing of the feed with respect to the overall rate of conversion. Extension of this invention to multimodal polymer particles with pre-selected sized components is anticipated. Further extension to the monomers and monomer mixes and to other surfactants, initiators, and the remaining components of a free radical emulsion polymerization recipe is anticipated.

Proper execution of a multimodal synthesis by the method of this invention requires that the degree of conversion of the monomer to polymer be known at any and all times. It further requires that the monomer feed rate to be alterable at any specified time. The conversion could best be measured by reaction calorimetry or precision densitometry, but any other technique that proves to be feasible could be used.

The underlying principal is best understood to be that an excess amount of surfactant is still present during all periods when new modes of particles are formed. The overall conversion is allowed to approach, but not reach, the faster polymerizing region of the Trommsdorff effect in the first stage. The monomer feed in the first stage begins at a rate faster than the rate of polymerization and is continued only until the overall conversion has dropped to a critical level. In the second stage, monomers are fed at a rate slower than the polymerization reaction and the monomer reaction is allowed to proceed to complete conversion to produce a bimodal latex. This process could be repeated to obtain further modes.

The number of modes is believed to be limited by the fact that an excess amount of surfactant must be present. In this perspective the bimodal or multimodal system is accepted as "normal" and then the monomodal latex can be considered to be a seeded latex preparation in which an excess of surfactant is present.

EXAMPLE 1

A prior art latex was prepared from the following composition and the process was utilized to plot FIG. 1.

|     | Ingredients |     |
| --- | --- | --- |
| (a) | Siponate DS-10 surfactant (5% solv.) | 5.04 grams |
|     | Triton X-100 surfactant (7% solv.) | 13.71 grams |
|     | acrylamide | 0.672 grams |
|     | NaHCO$_3$ | 0.048 grams |
|     | de-ionized water | 309.81 grams |
|     | K$_2$S$_2$O$_8$ (3% solv.) | 9.60 grams |
| (b) | methacrylic acid | 0.192 grams |
|     | styrene | 96.00 grams |
|     | tert-dodecyl mercaptan | 0.288 grams |

This latex was prepared by charging ingredients (a) into a 2-liter Morton flask. The solution was sparged with nitrogen for 40 minutes during the heat-up period to a temperature of about 73° C. Ingredients (b) were then added under moderate agitation and the monomers were copolymerized at temperatures of about 73° C. to 75° C. until the polymerization was essentially complete.

EXAMPLE 2

A latex prepared from the ingredients in Example 1 except that 7.10 grams of a 0.5% solution of Siponate DS-10 were used. The process was changed in that only 20% by weight of the monomer mixture (b) was charged initially and polymerized until the Trommsdorff gel effect occurred. Thereafter, the remaining 80% of the monomers (b) were fed to the reactor over a time period of 3 hours. With reference to FIG. 1, the 80% monomer feed occurred between points B and C. The 80% monomer feed was added at a rate proportional to the consumption and polymerization rate such that the instantaneously calculated conversion remains essentially constant.

EXAMPLE 3

A latex was made in accordance with the process of this invention and the process characteristics were plotted in FIG. 2.

|     | Ingredients |     |
| --- | --- | --- |
| (a) | Siponate DS-10 (0.5% solv.) | 7.10 grams |
|     | Triton X-100 (7% solv.) | 13.71 grams |
|     | acrylamide | 0.672 grams |
|     | NaHCO$_3$ | 0.048 grams |
|     | de-ionized water | 309.81 grams |
|     | K$_2$S$_2$O$_8$ (3% solv.) | 9.60 grams |
| (b) | methacrylic acid | 0.192 grams |
|     | styrene | 96.00 grams |
|     | tert-dodecyl mercaptan | 0.288 grams |

The water solution in the reactor was prepared as described in Example 1. About 20% by weight of the monomer mixture (b) was charged initially and copolymerized until about 70% of the 20% initial monomer mixture was polymerized which was prior to the onset of the Trommsdorff gel effect. The remaining 80% of the monomers then were fed into the reactor in two stages. The first monomer feed was about 65% by weight of monomers (b) over a period of about 1.5 hours. The feed rate to the reactor was greater than the polymerization conversion by a ratio of about 4/1 whereby considerably excess unreacted monomer exists in the reaction mixture at this stage. With reference to FIG. 2, the first stage 65% monomer fraction was fed to the reactor prior to the Trommsdorff gel effect (G to H) wherein the feed is represented between points D to E. The polymerization level at point E was approximately 44% by weight of the total monomers added. The remaining 15% portion of monomers (b) were then added in a second stage and subsequent to the start of the Trommsdorff gel (G). The second stage 15% monomers (b) started at point H and continued from point H to point I.

Table I hereinbelow gives the volume-surface average polymer particle sizes and the polydispersity (Dw/Dn) obtained wherein the weight average polymer particle size (Dw) is divided by the average polymer particle size (Dn). For reference purposes, a polydispersity of 1.0 would indicate uniform size monodisperse polymer particles.

TABLE I

|  | No. Average Particle Size | Dw/Dn | Remarks |
| --- | --- | --- | --- |
| Example 1 | 3989 Å | 1.0133 | monodisperse |
| Example 2 | 3716 Å | 1.0088 | monodisperse |
| Example 3 | 2397 Å* | 1.1318 | polydisperse bimodal |

*Example 3 particle size was based on a bimodal polymer particle size distribution of
1940 Å Dw/Dn = 1.03
2780 Å Dw/Dn = 1.01

The foregoing example illustrates the merits of this invention to provide an in-situ latex blend of bimodal polymer particles wherein one mode of particle size distribution is considerably larger than the other mode.

The foregoing is not intended to be limiting except as set forth in the appended claims.

I claim:

1. In an emulsion process for polymerizing ethylenically unsaturated monomers in an aqueous reaction medium to provide stabilized latex polymer particles having an average number weight particle size between about 0.05 and 1 micron, the improvement comprising:

polymerizing an initial charge of said monomers of between 2% and 20% by weight of the total monomers in said aqueous reaction medium to provide pre-reacted polymer seed particles;

reacting a first monomer feed of between about 10% and 40% by weight of the total monomers by feeding said first monomers to the aqueous reaction medium at a feed rate faster than the monomer polymerization rate of said first monomers until the onset of the Trommsdorff gel exotherm effect;

reacting the remaining weight of said total monomers by feeding said remaining monomers to the aqueous reaction mixture at a feed rate slower than the polymerization rate of said monomers to provide a bimodal in-situ blend of polymer particles wherein the larger modal of polymer particles is between about 1.1 and 6 times the size of the smaller modal of polymer particles.

2. The process in claim 1 wherein the in-situ bimodal blend comprises larger modal particles between about 1.5 and 3 times larger than the smaller modal particles.

3. The process in claim 1 wherein one of the modals of polymer particles is essentially monodispersed.

4. The process in claim 1 wherein both the larger modal and the smaller modal of the bimodal blend are monodispersed modals of polymer particles.

* * * * *